(12) United States Patent
Lynch

(10) Patent No.: US 8,128,413 B2
(45) Date of Patent: Mar. 6, 2012

(54) CHILDBIRTH TEACHING APPAREL

(76) Inventor: Bridget Lynch, Toronto (CA)

( * ) Notice: Subject to any disclaimer, the term of this patent is extended or adjusted under 35 U.S.C. 154(b) by 481 days.

(21) Appl. No.: 12/455,087

(22) Filed: May 28, 2009

(65) Prior Publication Data

US 2009/0298035 A1 Dec. 3, 2009

(30) Foreign Application Priority Data

May 30, 2008 (CA) .................................. 2632887

(51) Int. Cl.
G09B 23/28 (2006.01)
(52) U.S. Cl. ........................................................ 434/273
(58) Field of Classification Search .................. 434/262, 434/267, 273; 2/69, 79, 104, 105; 446/296, 446/304
See application file for complete search history.

(56) References Cited

U.S. PATENT DOCUMENTS

| | | | |
|---|---|---|---|
| 2,551,433 A | 5/1951 | Graves | |
| 2,551,560 A | 5/1951 | Graves | |
| 4,195,420 A * | 4/1980 | Fields | 434/273 |
| 4,389,733 A | 6/1983 | Boykins, Jr. | |
| 4,531,919 A * | 7/1985 | Ware | 434/262 |
| 4,883,442 A * | 11/1989 | Kaplan | 446/320 |
| 5,207,728 A | 5/1993 | Fogarty et al. | |
| 5,308,277 A * | 5/1994 | Nielsen | 446/320 |
| D347,655 S * | 6/1994 | Munro | D19/62 |
| 5,561,865 A | 10/1996 | Fjelstul | |
| 6,206,005 B1 | 3/2001 | Keyes | |
| 7,465,168 B2 * | 12/2008 | Allen et al. | 434/273 |
| 7,996,919 B2 * | 8/2011 | Gardner et al. | 2/69 |

\* cited by examiner

*Primary Examiner* — Kurt Fernstrom
(74) *Attorney, Agent, or Firm* — Kagan Binder PLLC

(57) ABSTRACT

This invention provides a childbirth teaching apparel for a user to demonstrate birth techniques. The childbirth teaching apparel is in the form of a pair of pants with a pair of leg portions and an abdominal portion, and a contiguous interior cavity. The pants have a doll-containing portion; and at least one side abdominal opening allowing access to the doll-containing portion; and a crotch between the leg portions where the leg portions meet the abdominal portion; the crotch having a secondary opening radially expandable to simulate a human vagina. This opening is connected to the doll-containing portion. A user can insert a doll simulating a human baby into the doll-containing portion; via one of the side abdominal openings; and push the doll through the secondary opening to simulate childbirth. A method and teaching kit for using the childbirth teaching apparel are also provided.

25 Claims, 16 Drawing Sheets

CHILDBIRTH TEACHING APPAREL

PRIORITY

The present patent application claims priority to Canadian Application No. 2,632,887, which was filed on May 30, 2008, and is incorporated herein by reference in its entirety.

FIELD OF THE INVENTION

This invention relates to a childbirth teaching apparel to enable a user to demonstrate childbirth and delivery techniques.

BACKGROUND OF THE INVENTION

Since the emergence of the human race, humans have been delivering babies, teaching others how to deliver babies, and providing methods and tools for assisting in that process. However, there remains a need for more and better tools for training health care professionals in the area of childbirth and delivery (e.g. in obstetrical or midwifery practice).

Mannequins and torso teaching devices are commonly used in training health care professionals for illustration of childbirth and delivery. These are human-sized plastic or resin models that anatomically simulate female anatomy. Certain models have a central cavity in the torso which is accessible through a front access door. A baby doll can be placed in the cavity to simulate a pregnancy. Some models also have a simulated birth canal through which the doll can be pushed to simulate delivery.

However, such models have a number of drawbacks. First, the models are often difficult to operate. The simulation birth canals may be too rigid so that the baby doll can become lodged in the model, frustrating the purpose of the demonstration (i.e. to witness a realistic birth).

Second, the construction of these mannequin or torso teaching devices makes them heavy and too cumbersome to transport easily. This makes it particularly difficult to provide training in remote, rural or developing areas in the world. Further, the high cost of these mannequins or torsos may prohibit low resource or low income areas from procuring or gaining access to such teaching devices.

There is an outstanding need to provide childbirth teaching devices that are simple, but effective, inexpensive and highly portable. There is also a need for a method to bring human participants more directly into the simulation of birth and delivery.

It would be desirable to provide a childbirth teaching apparel for demonstration of birth and delivery.

SUMMARY OF THE INVENTION

According to one aspect of the invention, a childbirth teaching apparel is provided for a user to demonstrate birth techniques. The childbirth teaching apparel is wearable by a user as pants and has:
  a front fabric segment sewn together with a back fabric segment, so as to provide a pair of pants having:
    a pair of leg portions and an abdominal portion, with a contiguous interior cavity;
  a doll-containing portion attached to the interior surface of the front segment of the abdominal portion;
  the doll-containing portion having at least one side abdominal opening allowing access to the doll-containing portion from an exterior of the pants; and
  a crotch between the leg portions where the leg portions meet the abdominal portion, the crotch having a secondary opening radially expandable to access the doll-containing portion and which thus simulates a human vagina.

The childbirth teaching apparel allows a user to insert a doll simulating a human baby into the doll-containing portion; via at least one of the side abdominal openings; and to push the doll through the secondary opening to simulate childbirth.

The doll-containing portion may be accessible from the contiguous interior cavity or via a side abdominal opening.

Preferably, there are at least two side abdominal openings allowing access to the doll-containing portion.

Preferably, the secondary opening has an annular periphery that is radially expandable. Preferably, the annular periphery is made of an elastic or stretchable fabric, such as the fabric typically comprising the waist or ankle regions of track pants, or the neck or wrist regions of sweatshirts.

Preferably, the secondary opening has an upper reinforcement to simulate a human pelvic arch.

Preferably, the upper reinforcement is made of a resilient material, such as a resilient plastic or the like.

Preferably, the doll-containing portion is sized for containing a doll that simulates a human baby to be delivered.

Preferably, the doll-containing portion is sized for containing the doll when coupled with a simulated placenta and a simulated umbilical cord.

Preferably, the childbirth teaching apparel is made of an elasticized fabric, such as stretchable cotton or stretchable polyester, such as athletic fleece (used in sweatshirts and track pants).

Preferably, the doll-containing portion forms a pouch attached to the childbirth teaching apparel; the pouch being accessible via at least one of the side abdominal openings; and connected to the secondary opening to allow the user to push the doll through the secondary opening to simulate childbirth.

Preferably, the upper end of the abdominal portion has a fastening mechanism for fastening the childbirth teaching apparel about the abdomen of the user. Examples of fastening mechanisms include a drawstring, elastic or the like.

According to another aspect of the invention, a method for a user to demonstrate birth techniques through a childbirth teaching apparel is provided, comprising:
  (a) putting on the childbirth teaching apparel having:
    a front fabric segment sewn together with a back segment, so as to provide a pair of pants having:
      a pair of leg portions and an abdominal portion, with a contiguous interior cavity;
      a doll-containing portion attached to the interior surface of the front segment of the abdominal portion;
      the doll-containing portion having at least one side abdominal opening allowing access to the doll-containing portion from an exterior of the pants; and
      a crotch between the leg portions where the leg portions meet the abdominal portion, the crotch having a secondary opening radially expandable to access the doll-containing portion, which thus simulates a human vagina
  (b) inserting a doll simulating a human baby into the doll-containing portion via one of the side abdominal openings; and
  (c) pushing the doll through the secondary opening to simulate childbirth.

Preferably, the user can also pull the doll through the secondary opening to simulate childbirth.

According to another aspect of this invention, a childbirth teaching kit is provided, comprising:

(a) a childbirth teaching apparel having:
  a front fabric segment sewn together with a back fabric segment, so as to provide a pair of pants having:
    a pair of leg portions and an abdominal portion, with a contiguous interior cavity;
    a doll-containing portion attached to the interior surface of the front segment of the abdominal portion;
    the doll-containing portion having at least one side abdominal opening allowing access to the doll-containing portion from an exterior of the pants; and
    a crotch between the leg portions where the leg portions meet the abdominal portion, the crotch having a secondary opening radially expandable to access the doll-containing portion, which thus simulates a human vagina;
(b) a doll simulating a human baby, the doll being sized to fit through the secondary opening when the secondary opening is fully expanded; and
(c) instructions for a user to:
  insert the doll into the doll-containing portion via at least one side abdominal opening; and
  push or pull the doll through the secondary opening to simulate childbirth.

Preferably, the doll may also be coupled to a simulated placenta via a simulated umbilical cord.

Preferably, the doll can be detachably connected to the simulated umbilical cord.

Preferably, the detachable connection is a fastener; such as a snap, button or Velcro® connection.

Although a pants embodiment has been described herein, it is contemplated that the invention could also be embodied in a pair of shorts, overalls or other wearable form.

DETAILED DESCRIPTION

A childbirth teaching apparel 1 for a user 100 to wear to demonstrate birth techniques is provided. FIGS. 2 & 5-9 show preferred embodiments of the childbirth teaching apparel.

Figure 1:
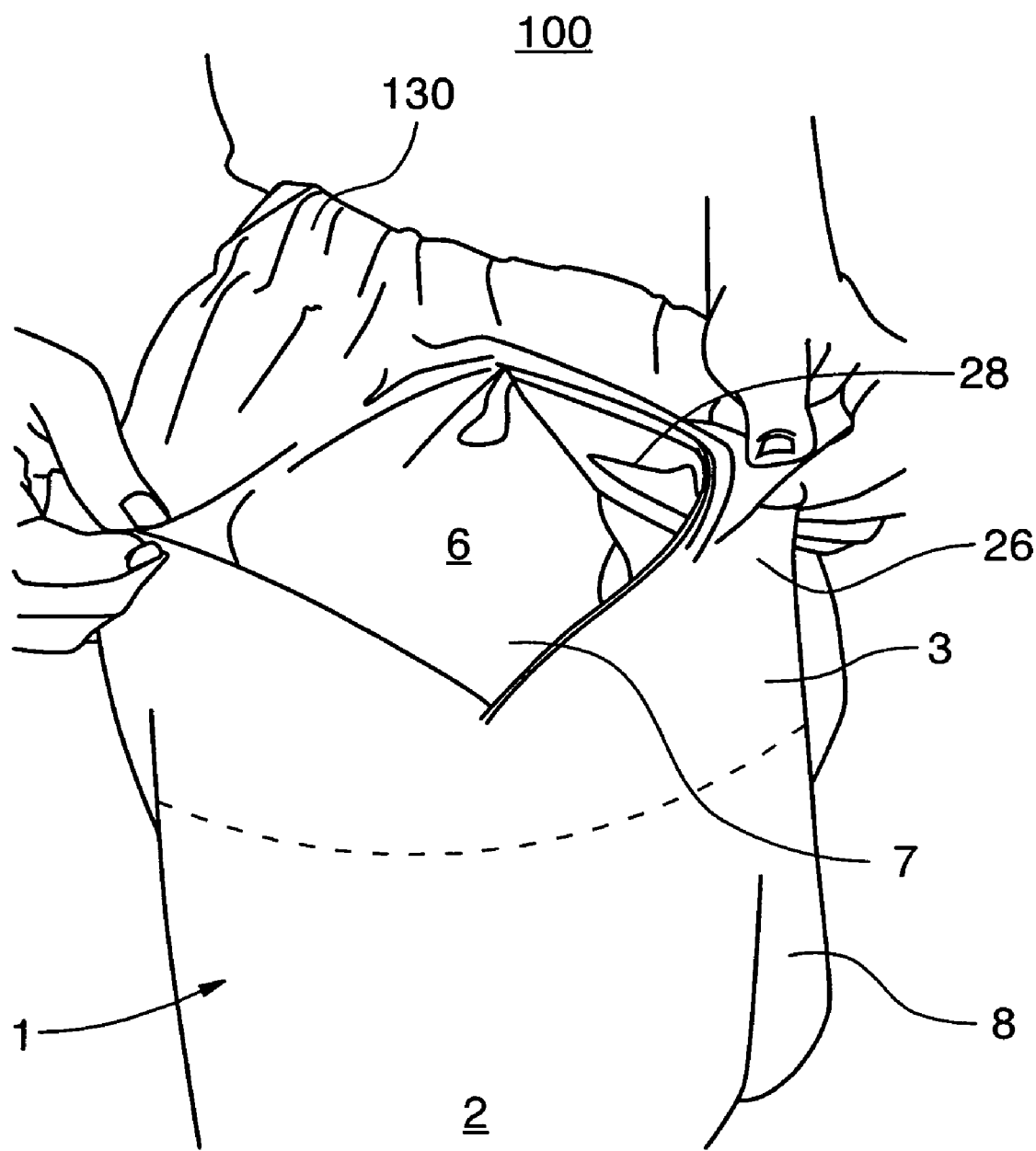
FIG. 1 is a side perspective showing a side abdominal opening allowing access to a doll-containing portion.
Figure 2:
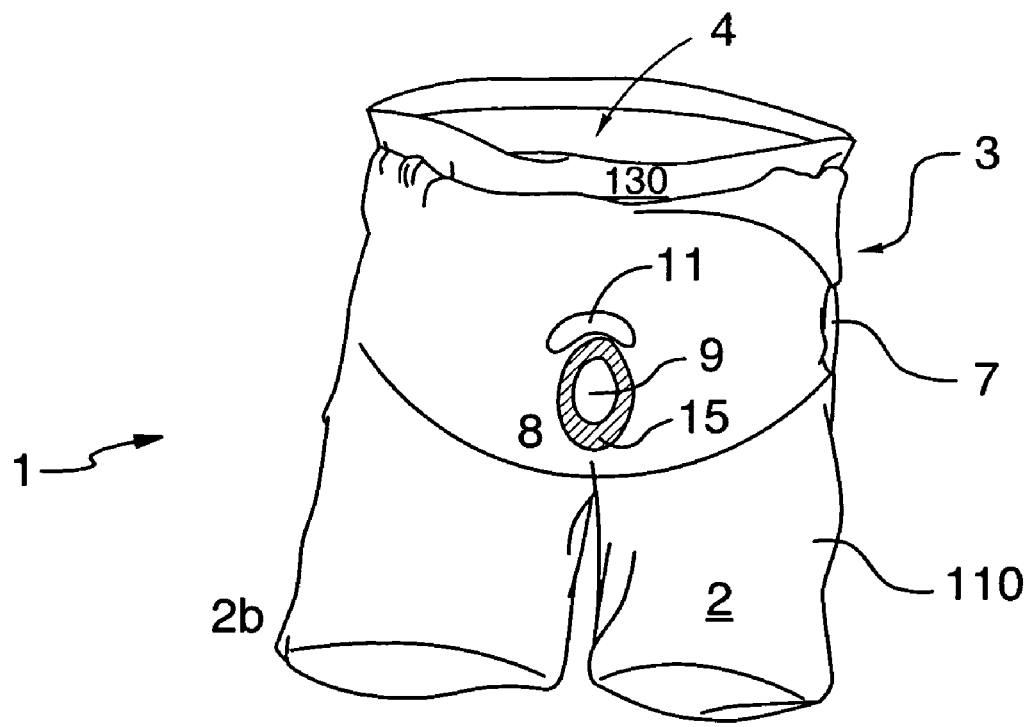
FIG. 2 is a front view of a childbirth teaching apparel.

FIGS. 1 and 2 show a childbirth teaching apparel 1 that has an exterior surface 110, a contiguous interior cavity 4, an upper portion comprising an abdominal portion 3 and lower portion comprising a pair of pant leg portions 2. The abdominal portion 3 has a fastening mechanism 130 for fastening the childbirth teaching apparel 1 about the abdomen of the user 100. The pair of leg portions 2 and the abdominal portion 3, together define the contiguous interior cavity 4 wearable by the user 100 as pants.

The region between the leg portions 2, where the leg portions 2 meet the abdominal portion 3, forms a crotch 8. The crotch 8 has a secondary opening 9, which simulates a human vagina. The periphery 15 of the secondary opening 9 is radially expandable.

The abdominal portion 3 contains a doll-containing portion 6, which is attached to the interior surface 28 of the front segment 26 of the abdominal portion 3. The doll-containing portion 6 is shown with at least one side abdominal opening 7 allowing access to the doll-containing portion 6. The side abdominal opening 7 provides the user 100 access to the doll 10 and doll-containing portion 6 within the abdominal portion 3 of the childbirth teaching apparel 1.

The secondary opening 9 is connected to the doll-containing portion 6 such that the user 100 can: (a) insert the doll 10 simulating a human baby into the doll-containing portion 6 via at least one of the side abdominal openings 7; and (b) push the doll 10 through the secondary opening 9 to simulate childbirth.

Figure 3:
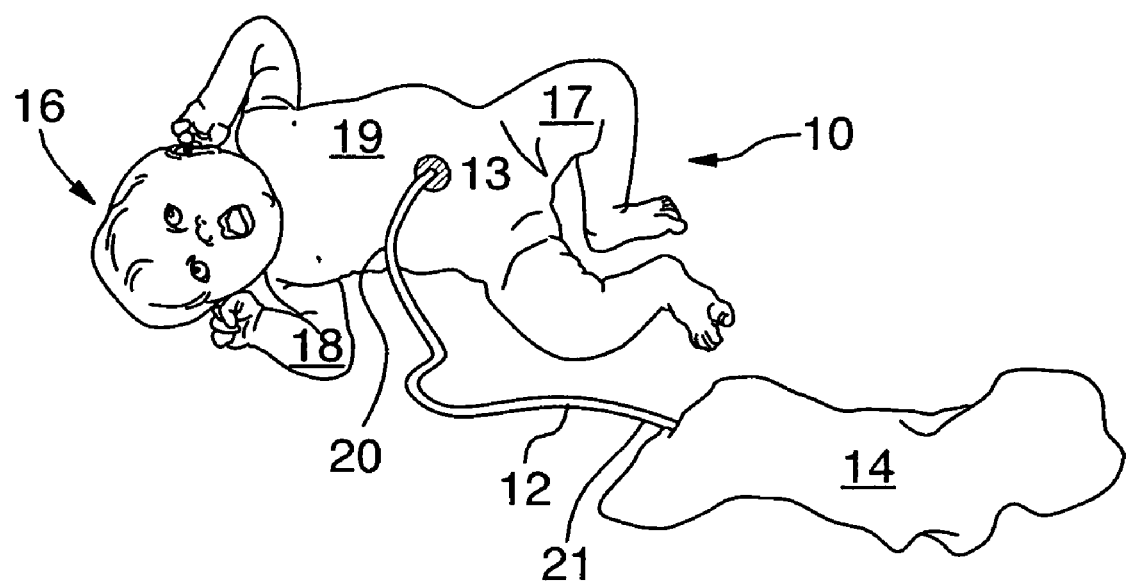
FIG. 3 is a front view of a doll simulating a human baby.

FIG. 3 shows a preferred embodiment of the doll 10 simulating a human baby. The doll 10 is comprised of a head 16, a body 19, a pair of arms 18 and a pair of legs 17. Also shown is a cord 12 simulating an umbilical cord, which is coupled to a simulated placenta 14. One end of the cord 20 is detachably connected to the doll 10 at a connection 13 simulating a navel and connected to the simulated placenta 14 on the other end 21.

Figure 4:
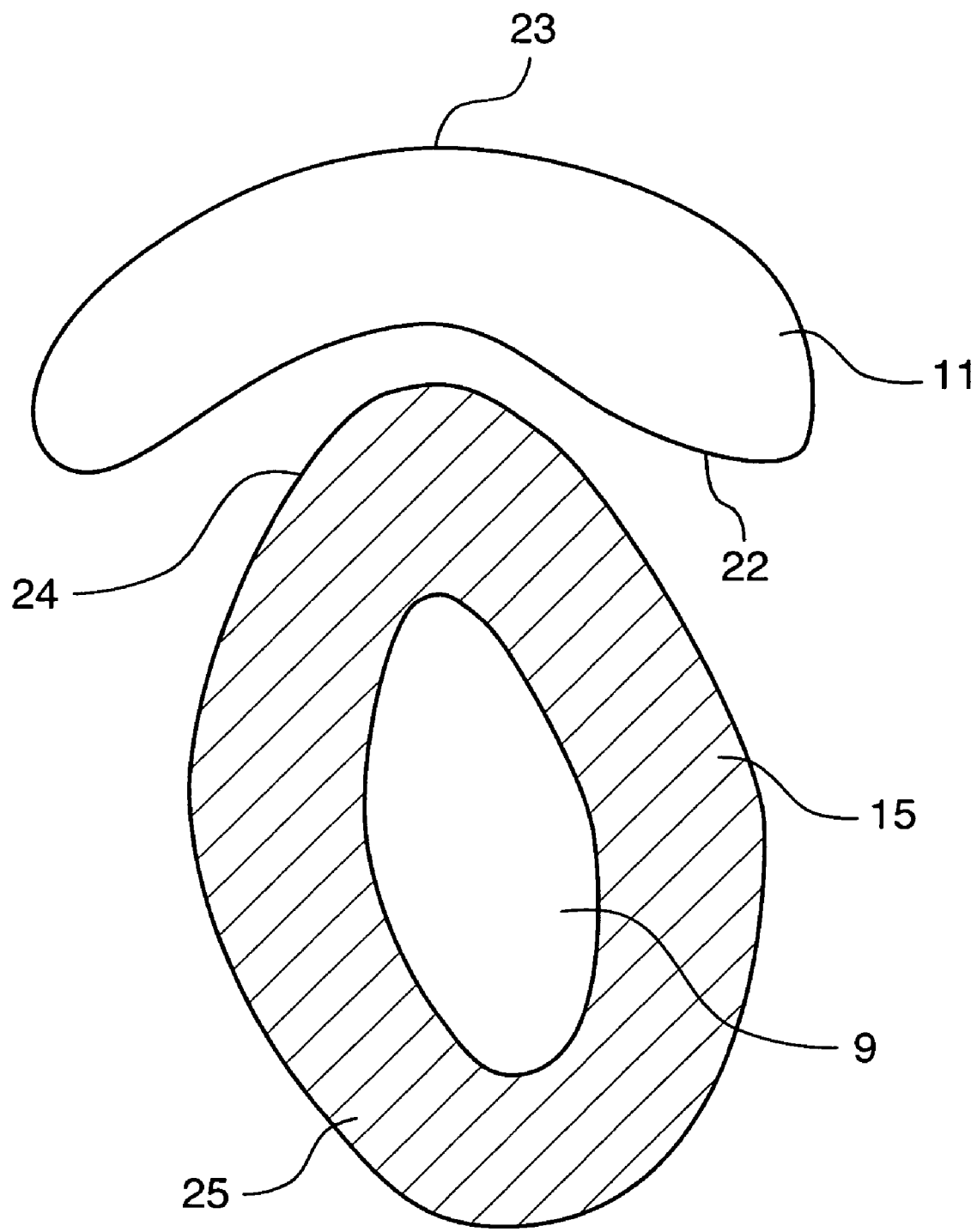
FIG. 4 is front view of a secondary opening and an upper reinforcement.

FIG. 4 shows a preferred embodiment of the secondary opening 9 and an upper reinforcement 11. The secondary opening 9 is the exit from the doll-containing portion 6. The periphery 15 of the secondary opening 9 defines an annular region which is radially expandable. The secondary opening 9 has an upper curvature 24 proximate to the abdominal portion 3 and a lower curvature 25 proximate to the leg portions 2.

Proximate to and situated above the upper curvature 24 of the secondary opening 9 is the upper reinforcement 11 which simulates a human pelvic arch. The upper reinforcement 11 is curved to form an arc over the upper curvature 24 of the secondary opening 9. The upper reinforcement 11 has an upper arc surface 23 and a lower arc surface 22.

FIGS. 5A-D show preferred embodiments demonstrating the insertion of the doll 10 into the doll-containing portion 6.

Figure 5A:
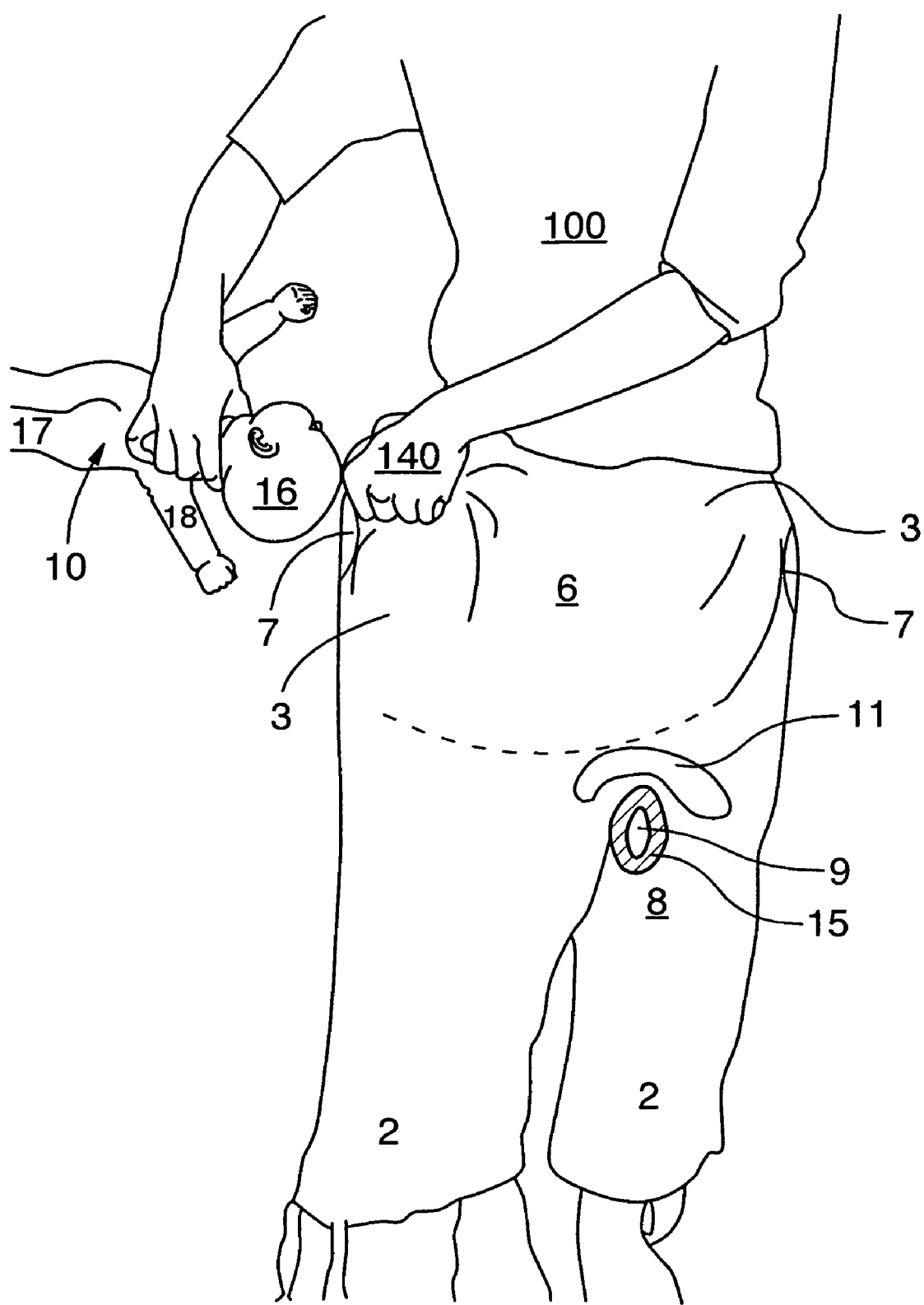
FIG. 5A is a front elevation of a user demonstrating the insertion of a doll.

FIG. 5A shows a front elevation of the childbirth teaching apparel 1 whereby the user 100 can insert the doll 10 through at least one of the side abdominal openings 7 of the childbirth teaching apparel 1 using at least one hand 140.

Figure 5B:
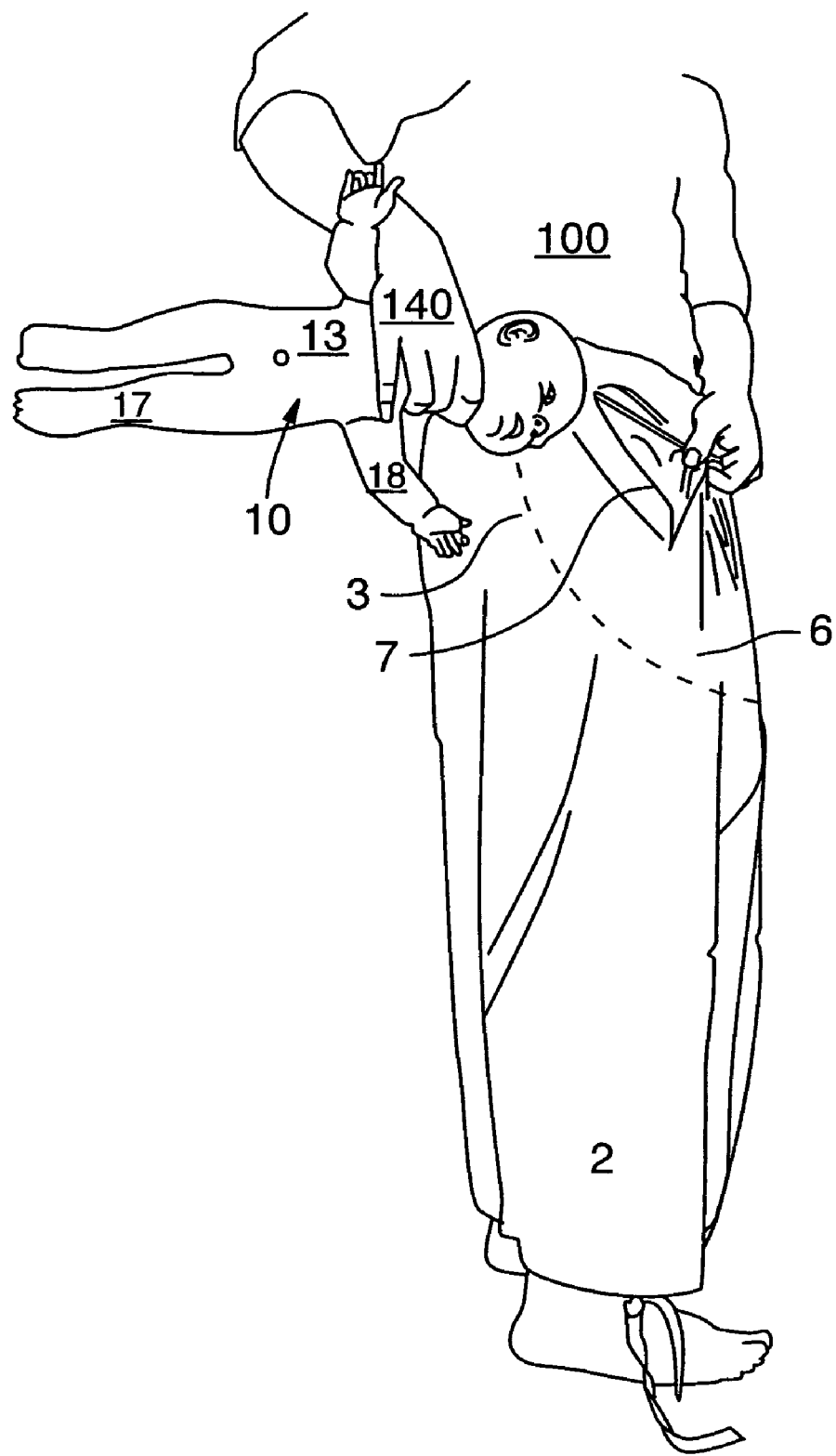
FIGS. 5B-D are side elevations of a user demonstrating the insertion of a doll.
Figure 5C:
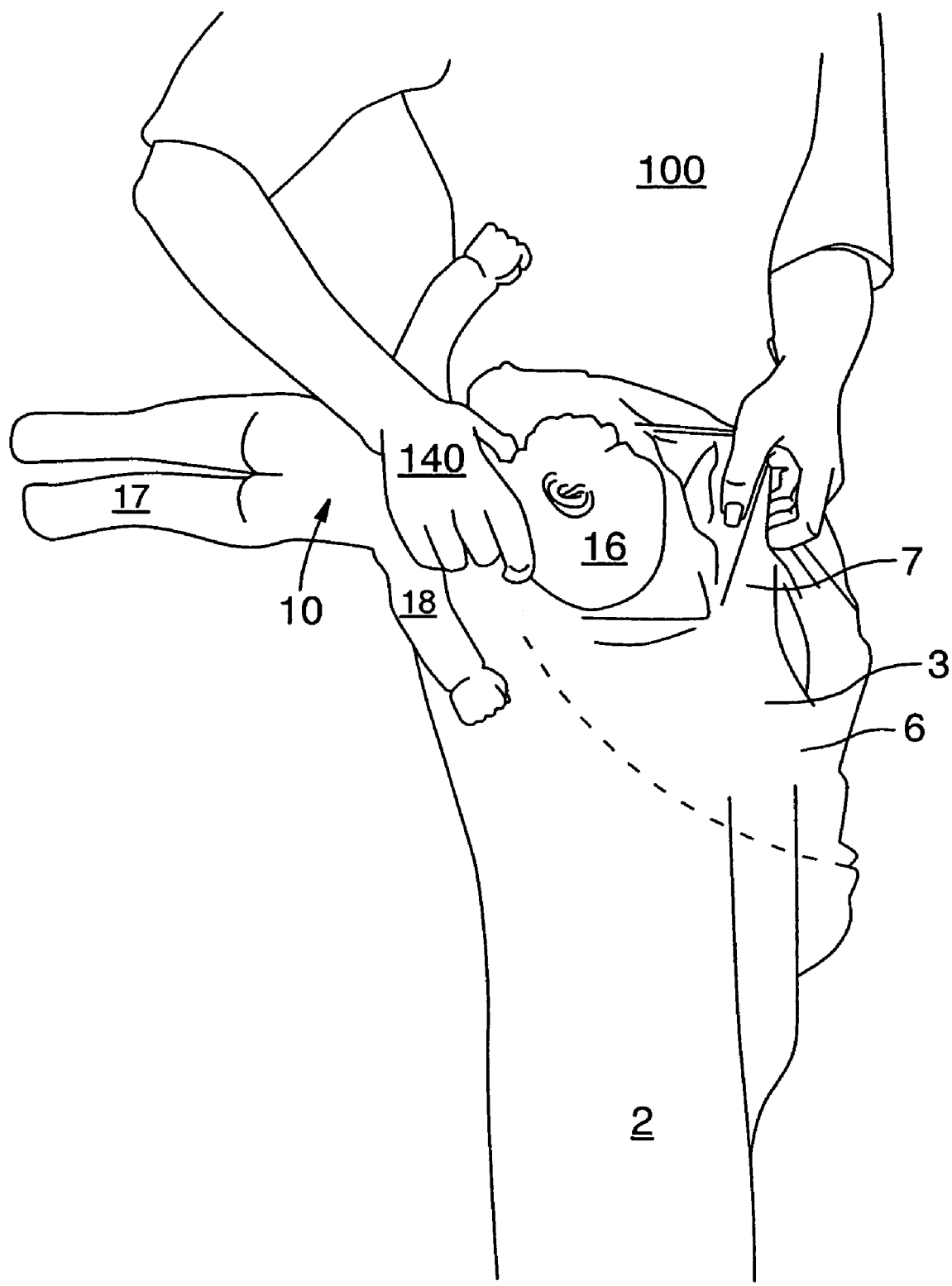
Figure 5D:
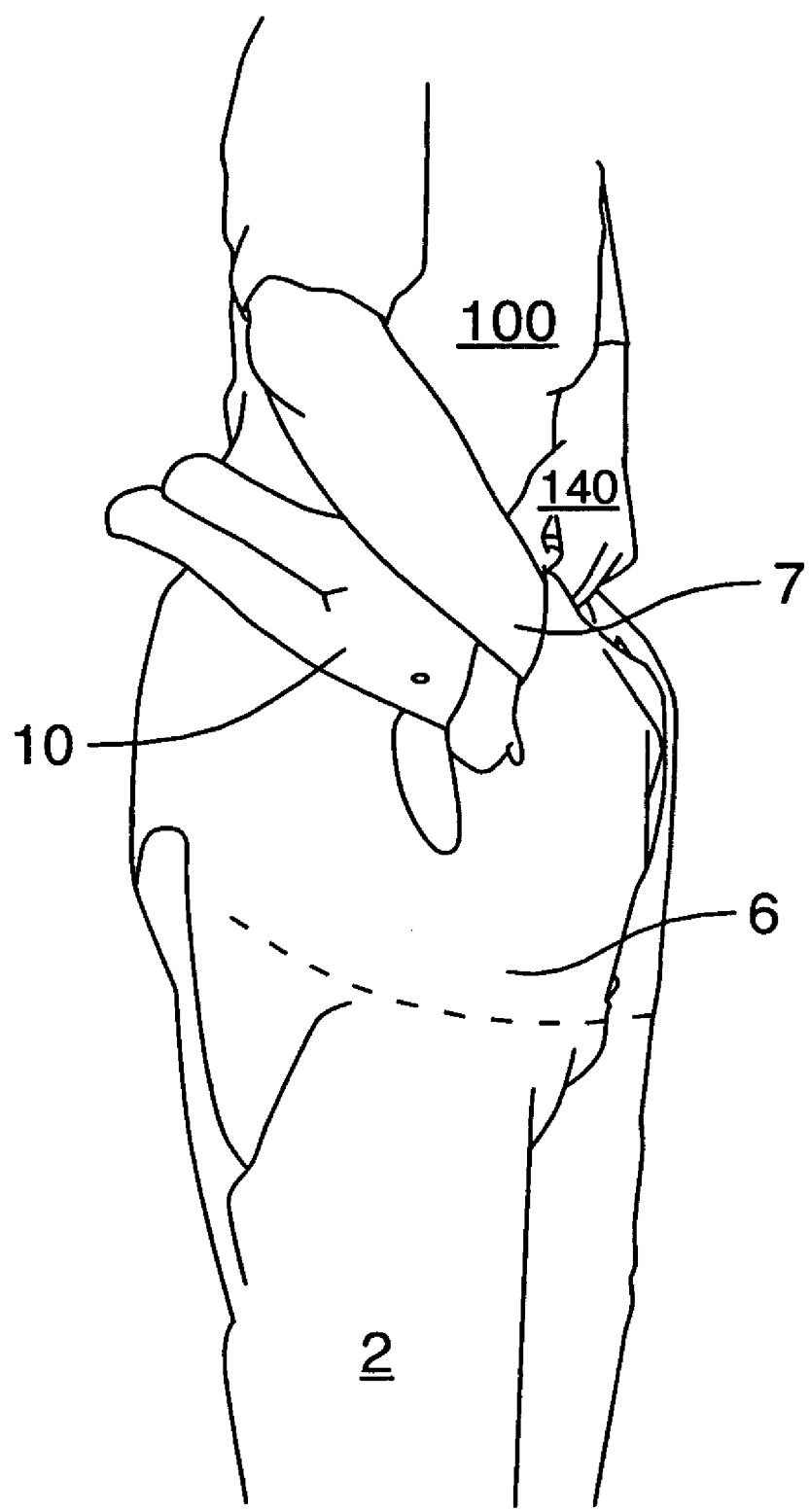

FIGS. 5B-D show side elevations of the childbirth teaching apparel 1 whereby the user 100 can insert the doll 10 into at least one of the side abdominal openings 7 using at least one hand 140.

FIGS. 5B-C show methods of positioning the doll 10 for insertion into the side abdominal opening 7. The user 100 is shown using at least one hand 140 to insert the doll 10 into at least one of the side abdominal openings 7 of the childbirth teaching apparel 1. FIG. 5D shows the doll 10 partially inserted into the doll-containing portion 6.

Figure 6:
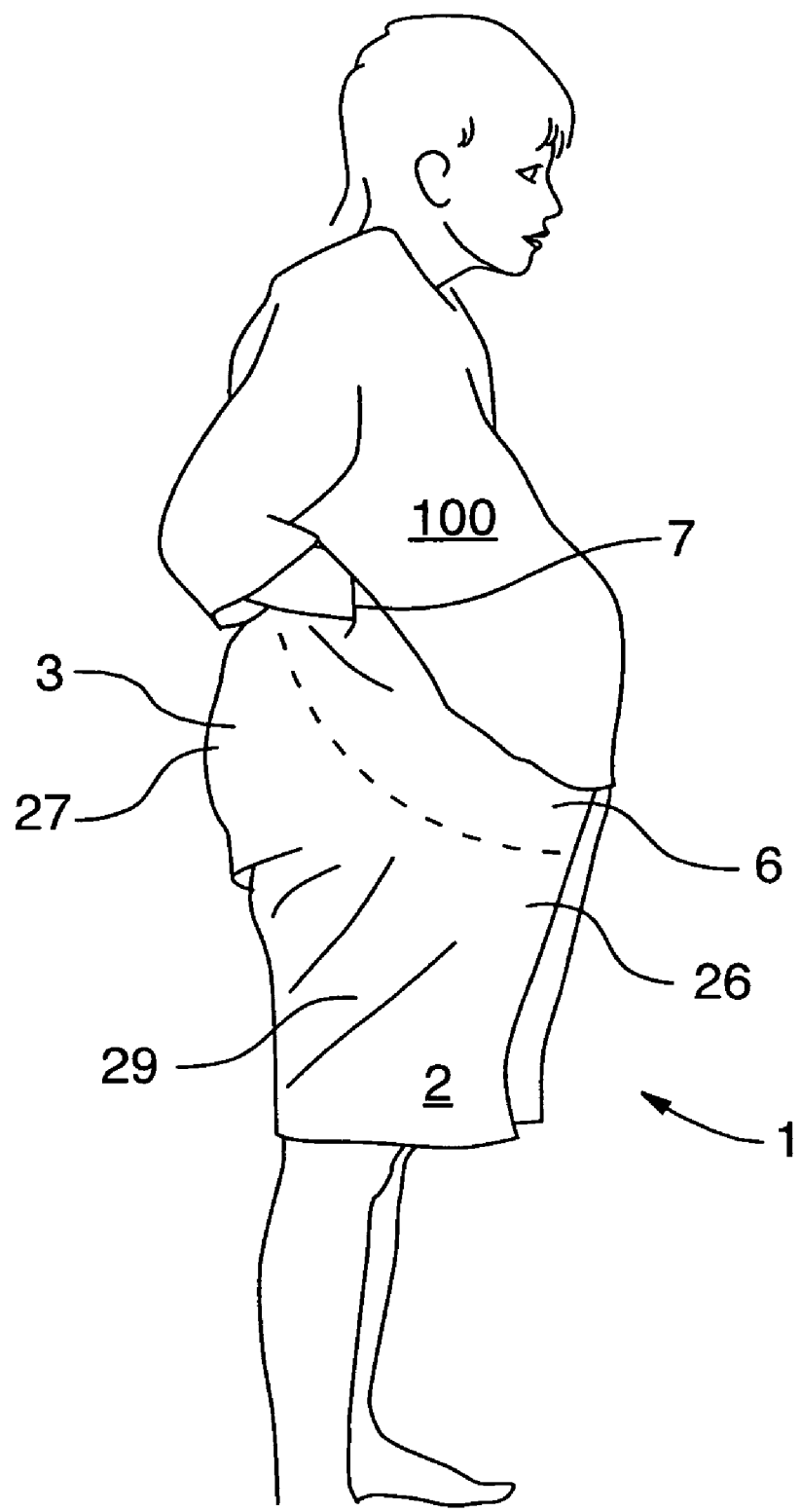
FIG. 6 is a side elevation showing a user wearing a childbirth teaching apparel with a doll inside a doll-containing portion.

FIG. 6 is a preferred embodiment showing a side elevation of the childbirth teaching apparel 1 worn by the user 100 showing the front segment 26, a back segment 27, the abdominal portion 3 and leg portions 2 of the childbirth teaching apparel 1. FIG. 6 is a view of the childbirth teaching apparel 1 when the doll 10 is contained within the doll-containing portion 6 to give the appearance that the user 100 is pregnant.

FIGS. 7A-F are preferred embodiments showing the user 100 demonstrating childbirth and delivery techniques using the childbirth teaching apparel 1.

Figure 7A:
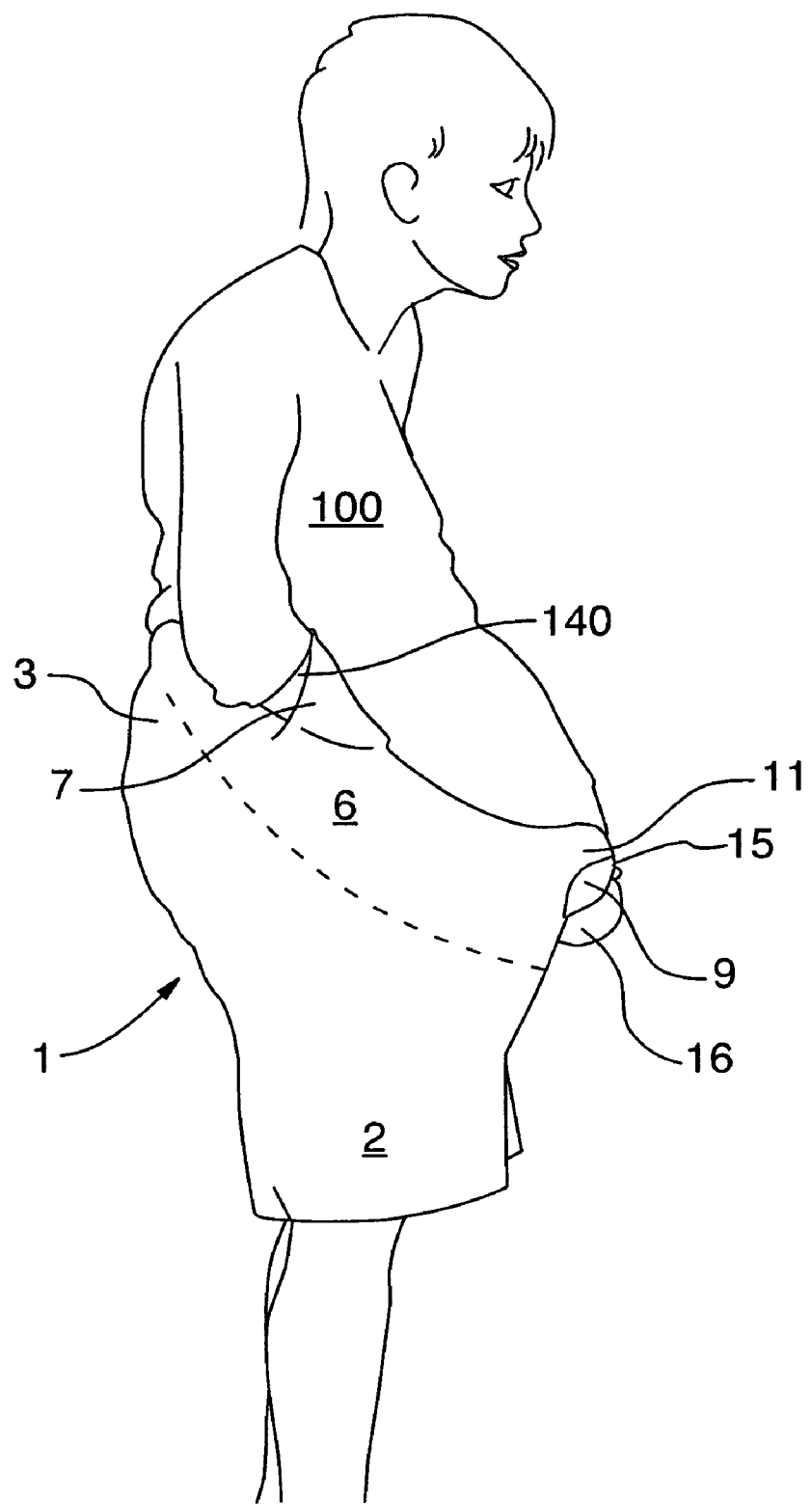
FIGS. 7A-F are side elevations showing a user demonstrating birth techniques.
Figure 7B:
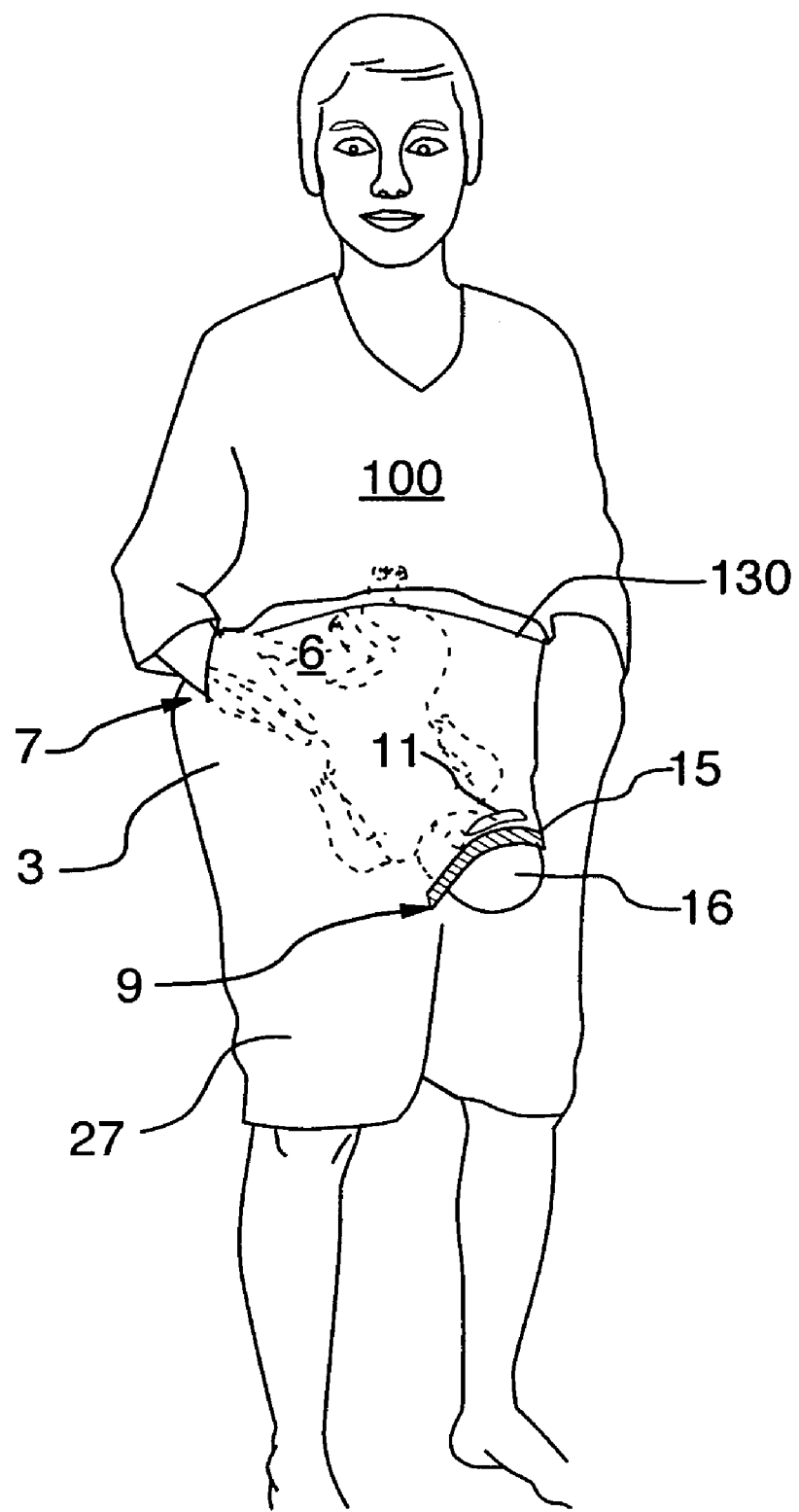

FIGS. 7A and 7B show the user 100 with one hand 140 inside the doll-containing portion 6 manipulating the doll 10 contained within the doll-containing portion 6. The user 100 is pushing the doll 10 from within the doll-containing portion 6 out through the secondary opening 9. The head 16 of the doll 10 is beginning to crown and protrude through the secondary opening 9 as the annular region at the periphery 15 of the secondary opening 9 radially expands.

Figure 7C:
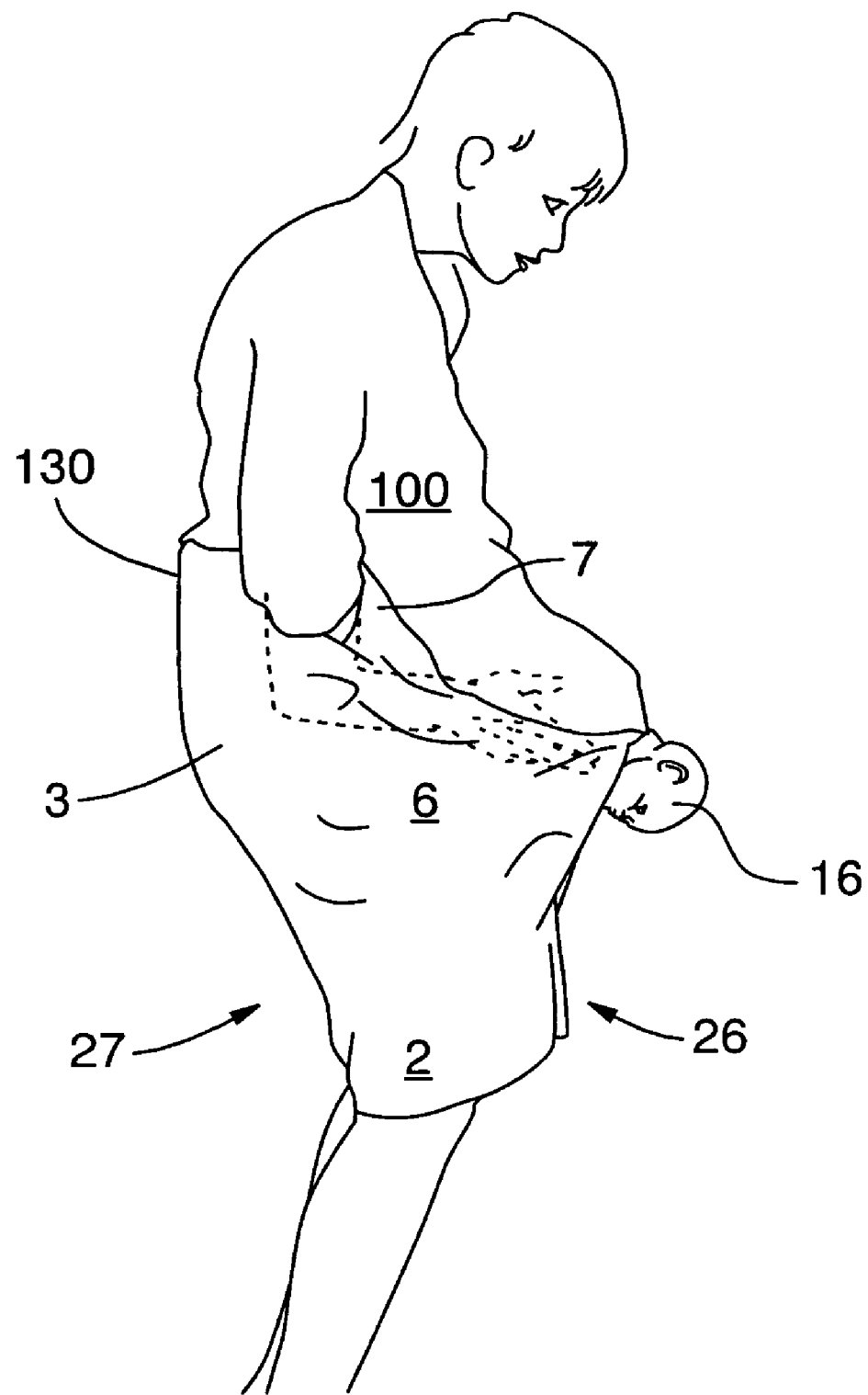

FIG. 7C shows a side elevation of the user 100 pushing the doll 10 out of the secondary opening 9 showing the head 16 being pushed out of the doll-containing portion 6.

Figure 7D:
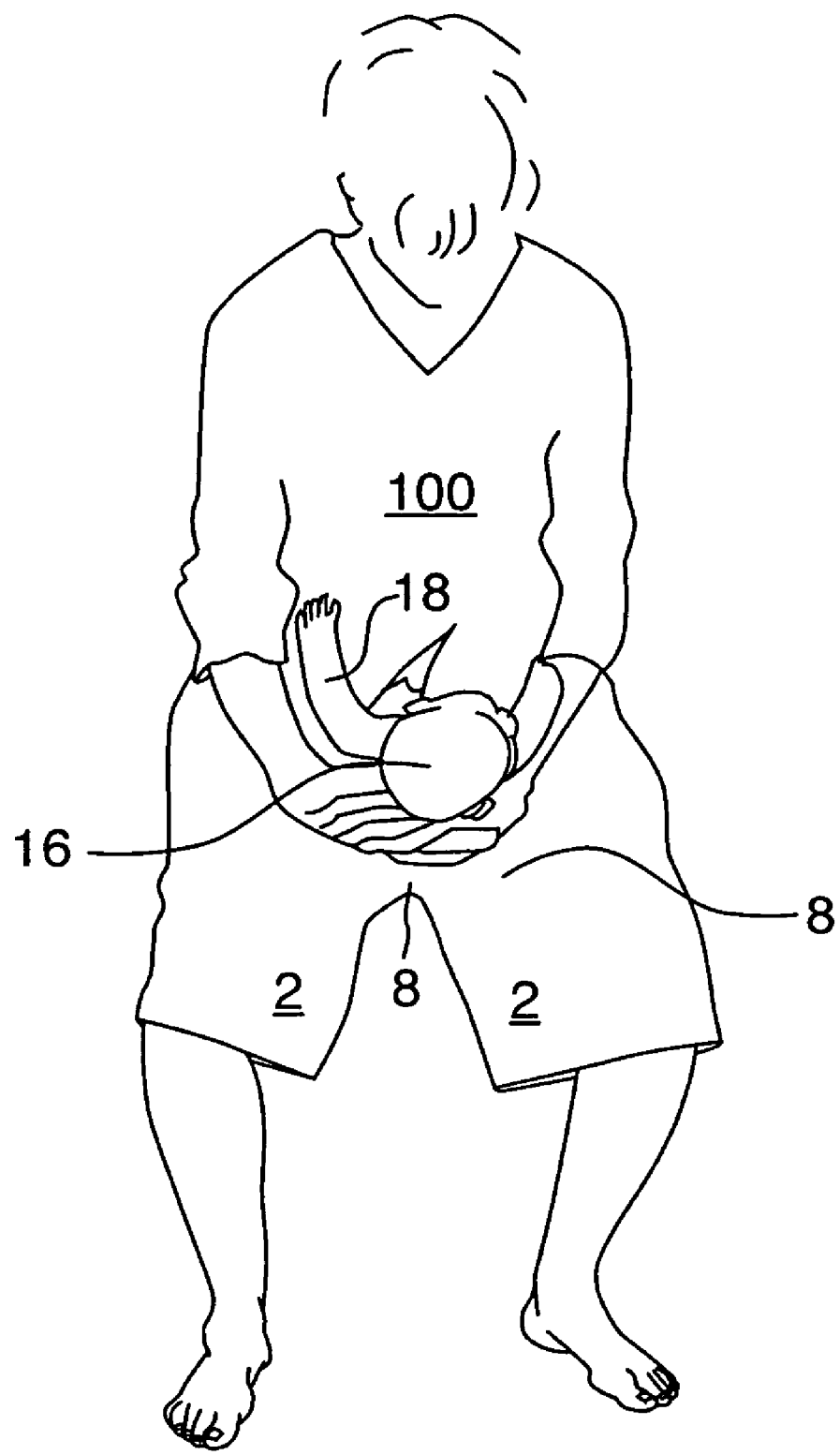

FIG. 7D shows a front elevation of the user 100 pulling the doll 10 out of the doll-containing portion 6 through the secondary opening 9.

Figure 7E:
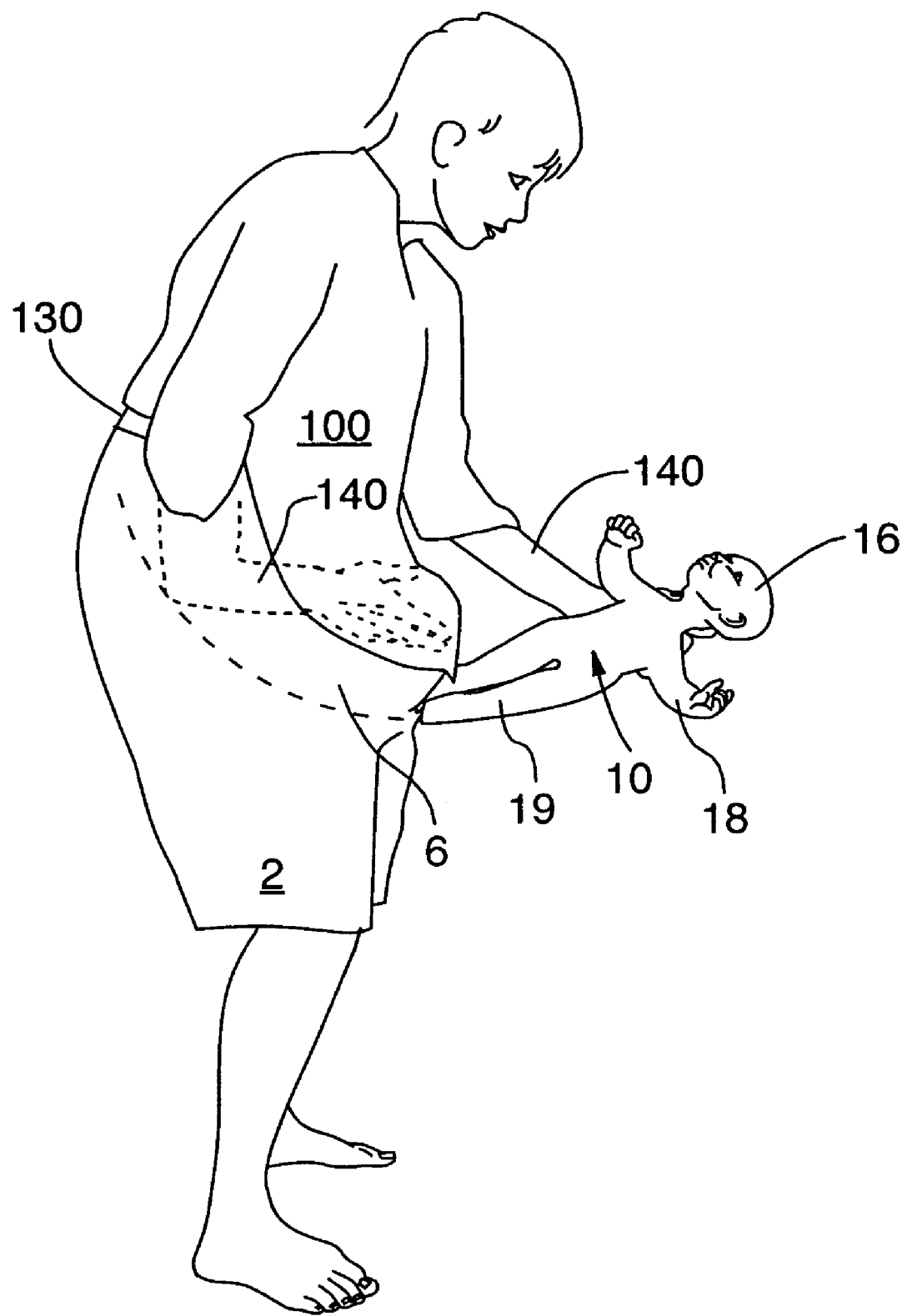

FIG. 7E shows a side elevation of the user 100 using one hand 140 to push and manipulate the doll 10 within the doll-containing portion 6. The user 100 is pushing the doll 10 through the secondary opening 9 with one hand 140 while pulling and guiding the doll 10 out of the secondary opening 9 with the use of the other hand 140.

Figure 7F:
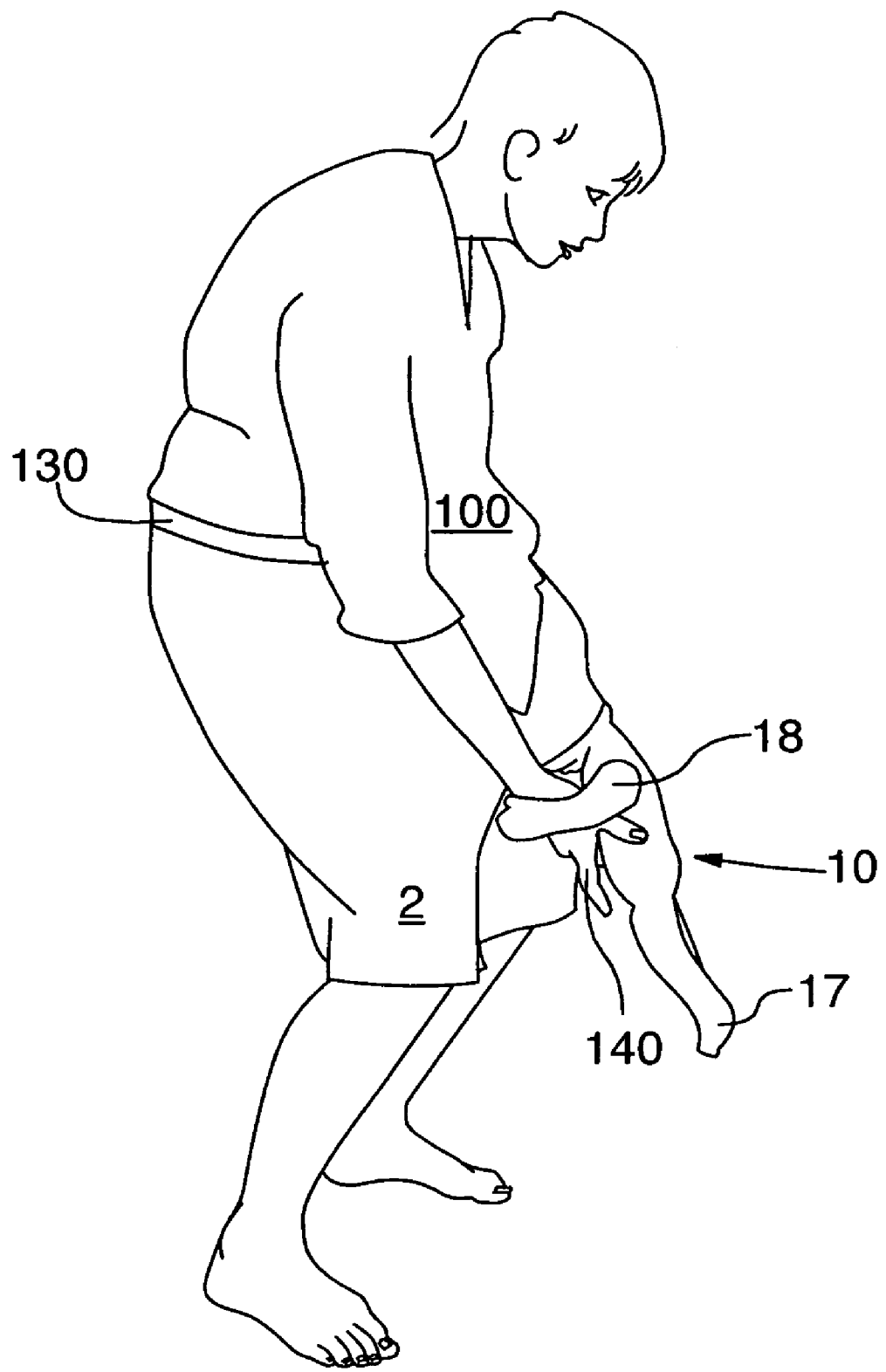

FIG. 7F shows a side elevation whereby the user 100 is demonstrating a birthing technique to simulate a breach delivery.

Figure 8:
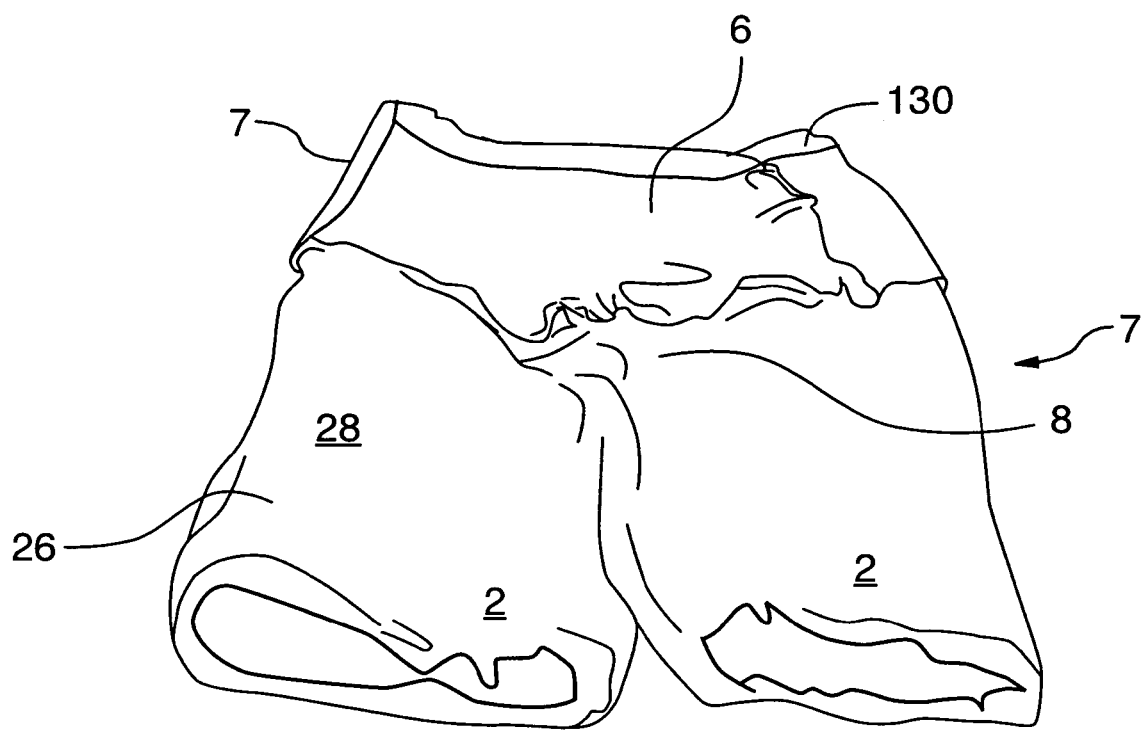
FIG. 8 is front view of the interior surface of a childbirth teaching apparel.

FIG. 8 is a preferred embodiment showing a front view of the interior surface 28 of the childbirth teaching apparel 1. The doll-containing portion 6 is shown as a pouch attached to the childbirth teaching apparel 1. The pouch or doll-containing portion 6 is accessible via one of the side abdominal openings 7 to the doll-containing portion 6; and is connected to the secondary opening 9.

Figure 9:
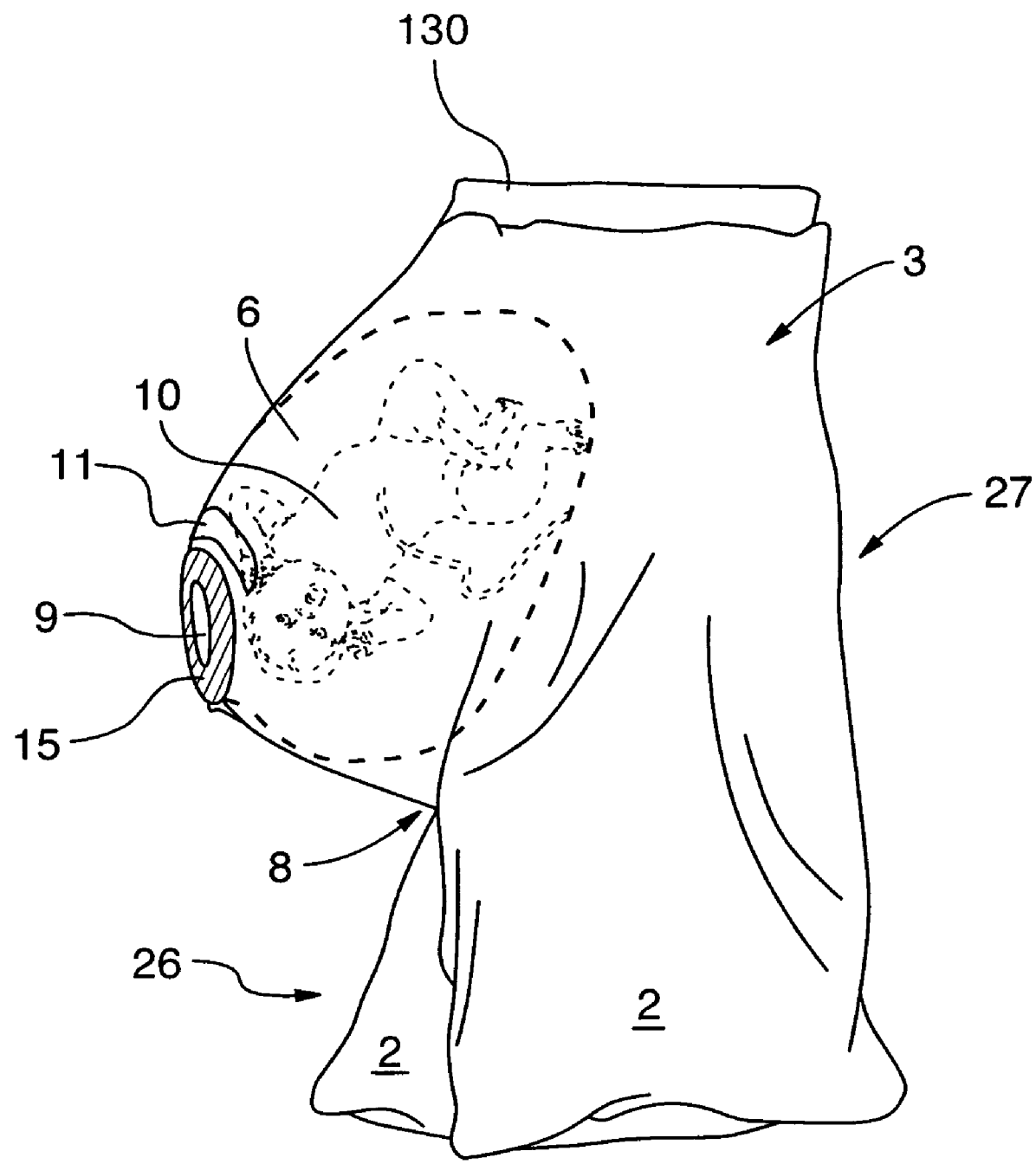
FIG. 9 is a cross-sectional view of a childbirth teaching apparel showing a doll within a doll-containing portion.

FIG. 9 is a preferred embodiment showing a cross-sectional view of the childbirth teaching apparel 1 showing the doll 10 within the doll-containing portion 6.

The foregoing is considered as illustrative only of the principles of the invention. Further, since numerous modifications and changes will readily occur to those skilled in the art, it is not desired to limit the invention to the exact configurations, components, materials and applications shown and described, and accordingly, all suitable modifications and equivalents may be resorted to, falling within the scope of the invention.

What is claimed is:

1. A childbirth teaching apparel wearable by a user as pants, comprising:
   a front fabric segment sewn together with a back fabric segment, so as to provide a pair of leg portions and an abdominal portion, with a continuous interior cavity in the pants;
   a doll-containing portion attached to an interior surface of the front segment at the abdominal portion of the pants;
   the doll-containing portion having at least one side abdominal opening allowing access to the doll-containing portion from an exterior of the pants; and
   a crotch between the leg portions where the leg portions meet the abdominal portion, the crotch having a secondary opening radially expandable to access the doll-containing portion, which thus simulates a human vagina;
   wherein the childbirth teaching apparel allows a user to insert a doll simulating a human baby into the doll-containing portion via the at least one side abdominal opening; and to push the doll through the secondary opening to simulate childbirth.

2. The childbirth teaching apparel of claim 1 wherein the childbirth teaching apparel is made of elasticized fabric.

3. The childbirth teaching apparel of claim 1 wherein the childbirth teaching apparel is made of cotton.

4. The childbirth teaching apparel of claim 1 wherein the childbirth teaching apparel is made of polyester.

5. The childbirth teaching apparel of claim 1 wherein the secondary opening has an upper reinforcement to simulate a human pelvic bone.

6. The childbirth teaching apparel of claim 5 wherein the upper reinforcement is made of a resilient material.

7. The childbirth teaching apparel of claim 6 wherein the upper reinforcement is made of plastic.

8. The childbirth teaching apparel of claim 1 wherein there are two side abdominal openings.

9. The childbirth teaching apparel of claim 1 wherein the at least one side abdominal opening is a fabric panel.

10. The childbirth teaching apparel of claim 1 wherein the doll-containing portion is accessible from the contiguous interior cavity.

11. The childbirth teaching apparel of claim 1 wherein the doll-containing portion is capable of containing a doll simulating a human baby.

12. The childbirth teaching apparel of claim 11 wherein the doll-containing portion is capable of containing the doll when coupled with a simulated placenta and a simulated umbilical cord.

13. The childbirth teaching apparel of claim 1 wherein the doll-containing portion is a pouch.

14. The childbirth teaching apparel of claim 1 wherein the secondary opening has an annular periphery that radially expands.

15. The childbirth teaching apparel of claim 14 wherein the annular periphery is made of an elastic fabric.

16. The childbirth teaching apparel of claim 1 wherein the abdominal portion has a fastening mechanism for fastening the childbirth teaching apparel about the abdomen of the user.

17. The childbirth teaching apparel of claim 16 wherein the fastening mechanism is a drawstring.

18. The childbirth teaching apparel of claim 16 wherein the fastening mechanism is comprised of elastic.

19. The childbirth teaching apparel of claim 1 wherein the childbirth teaching apparel is a pair of overalls.

20. A method for a user to demonstrate birth techniques through a childbirth teaching apparel, comprising:
   (a) putting on the childbirth teaching apparel having:
      a front fabric segment sewn together with a back fabric segment, so as to provide a pair of pants having:
      a pair of leg portions and an abdominal portion, with a contiguous interior cavity;
      a doll-containing portion attached to the interior surface of the front segment of the abdominal portion;
      the doll-containing portion having at least one side abdominal opening allowing access to the doll-containing portion from an exterior of the pants; and
      a crotch between the leg portions where the leg portions meet the abdominal portion, the crotch having a secondary opening radially expandable to access the doll-containing portion, which thus simulates a human vagina;
   (b) inserting a doll simulating a human baby into the doll-containing portion via one of the side abdominal openings; and
   (c) pushing the doll through the secondary opening to simulate childbirth.

21. The method of claim 20 wherein the user can pull the doll through the secondary opening to simulate childbirth.

22. A childbirth teaching kit, comprising:
(a) a childbirth teaching apparel having:
a front fabric segment sewn together with a back fabric segment, so as to provide a pair of pants having:
a pair of leg portions and an abdominal portion, with a contiguous interior cavity;
a doll-containing portion attached to the interior surface of the front segment of the abdominal portion;
the doll-containing portion having at least one side abdominal opening allowing access to the doll-containing portion from an exterior of the pants; and
a crotch between the leg portions where the leg portions meet the abdominal portion, the crotch having a secondary opening radially expandable to access the doll-containing portion, which thus simulates a human vagina;
(b) a doll simulating a human baby, the doll being sized to fit through the secondary opening when the secondary opening is fully expanded; and
(c) instructions for a user to:
insert the doll into the doll-containing portion via the at least one side abdominal opening; and
push or pull the doll through the secondary opening to simulate childbirth.

23. The kit of claim 22 wherein the doll is coupled to a simulated placenta via a simulated umbilical cord.

24. The kit of claim 23 wherein the doll is detachably connected to the simulated umbilical cord.

25. The kit of claim 24 wherein the doll is connected to the simulated umbilical cord by a fastener.

* * * * *